United States Patent
Kumagai

(10) Patent No.: US 10,042,515 B2
(45) Date of Patent: Aug. 7, 2018

(54) USING GENTURE DIRECTION TO INPUT DATA INTO MULTIPLE SPIN DIAL LIST BOXES

(71) Applicant: Rakuten, Inc., Tokyo (JP)

(72) Inventor: Tomoharu Kumagai, Tokyo (JP)

(73) Assignee: Rakuten, Inc., Tokyo (JP)

( * ) Notice: Subject to any disclaimer, the term of this patent is extended or adjusted under 35 U.S.C. 154(b) by 330 days.

(21) Appl. No.: 14/651,252

(22) PCT Filed: Aug. 8, 2014

(86) PCT No.: PCT/JP2014/071043
§ 371 (c)(1),
(2) Date: Jun. 11, 2015

(87) PCT Pub. No.: WO2016/021049
PCT Pub. Date: Feb. 11, 2016

(65) Prior Publication Data
US 2016/0283048 A1    Sep. 29, 2016

(51) Int. Cl.
*G06F 3/0482* (2013.01)
*G06F 3/0484* (2013.01)
*G06F 3/0488* (2013.01)
*G06F 3/0485* (2013.01)

(52) U.S. Cl.
CPC .......... *G06F 3/0482* (2013.01); *G06F 3/0485* (2013.01); *G06F 3/04847* (2013.01); *G06F 3/04883* (2013.01); *G06F 3/04886* (2013.01)

(58) Field of Classification Search
CPC . G06F 3/0482; G06F 3/04847; G06F 3/04883
See application file for complete search history.

(56) References Cited

U.S. PATENT DOCUMENTS

| 9,652,056 | B2 * | 5/2017 | Park | G06F 3/03547 |
| 2004/0095395 | A1 * | 5/2004 | Kurtenbach | G06F 3/0482 |
| | | | | 715/810 |
| 2007/0168890 | A1 * | 7/2007 | Zhao | G06F 3/04883 |
| | | | | 715/863 |

(Continued)

FOREIGN PATENT DOCUMENTS

JP    2001-282516 A    10/2001

OTHER PUBLICATIONS

International Preliminary Report on Patentability with translation of Written Opinion dated Feb. 23, 2017, issued by the International Searching Authority in application No. PCT/JP2014/071043.

*Primary Examiner* — Eric J Bycer
(74) *Attorney, Agent, or Firm* — Sughrue Mion, PLLC

(57) ABSTRACT

A data input system includes a display control unit that displays a plurality of list boxes configured to allow selection of one choice among a plurality of choices on a display screen, the plurality of list boxes placed side by side along a direction substantially orthogonal to a direction of receiving an input to change a choice selectable in each of the list boxes, and a control unit that determines both of a list box whose choice is to be changed among the plurality of list boxes and a direction of a change of a choice in the list box based on a position of a point input in a region including the plurality of list boxes on the display screen and a direction of indication indicating a motion from the point as a starting point.

10 Claims, 10 Drawing Sheets

(a)

(b)

(56) References Cited

U.S. PATENT DOCUMENTS

| | | | |
|---|---|---|---|
| 2008/0263095 A1* | 10/2008 | Porter, III | G06F 3/04842 |
| 2010/0073329 A1* | 3/2010 | Raman | G06F 3/04883 |
| | | | 345/177 |
| 2010/0156833 A1* | 6/2010 | Kim | G06F 3/0485 |
| | | | 345/173 |
| 2011/0080351 A1* | 4/2011 | Wikkerink | G06F 3/04883 |
| | | | 345/173 |
| 2011/0191675 A1* | 8/2011 | Kauranen | G06F 3/04847 |
| | | | 715/702 |
| 2013/0205262 A1* | 8/2013 | Kauranen | G06F 3/04847 |
| | | | 715/863 |

* cited by examiner

Fig. 5
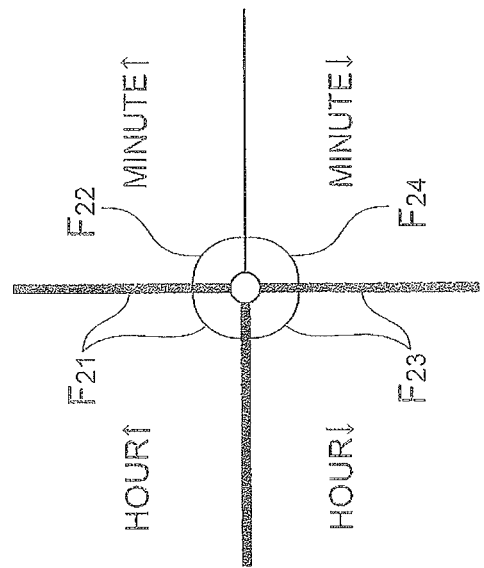
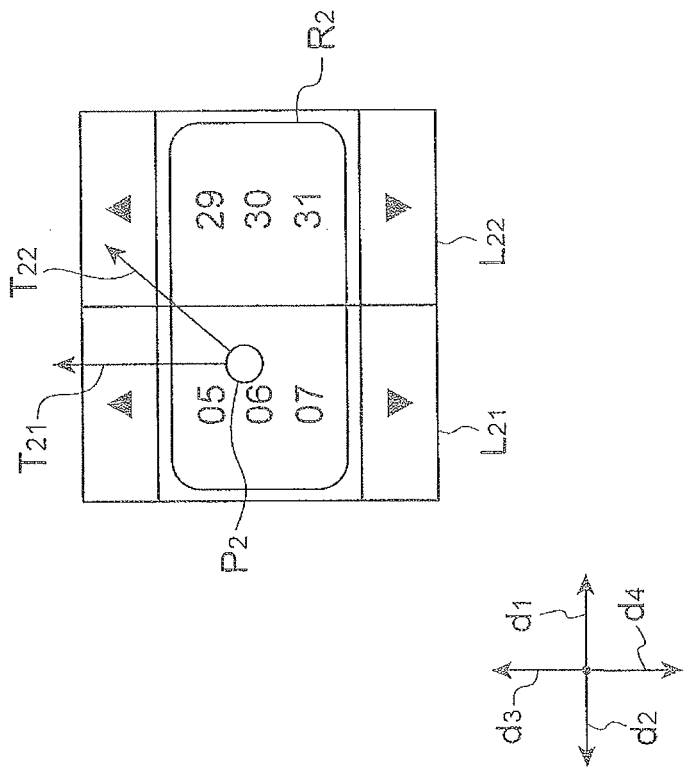

Fig. 6
(a)
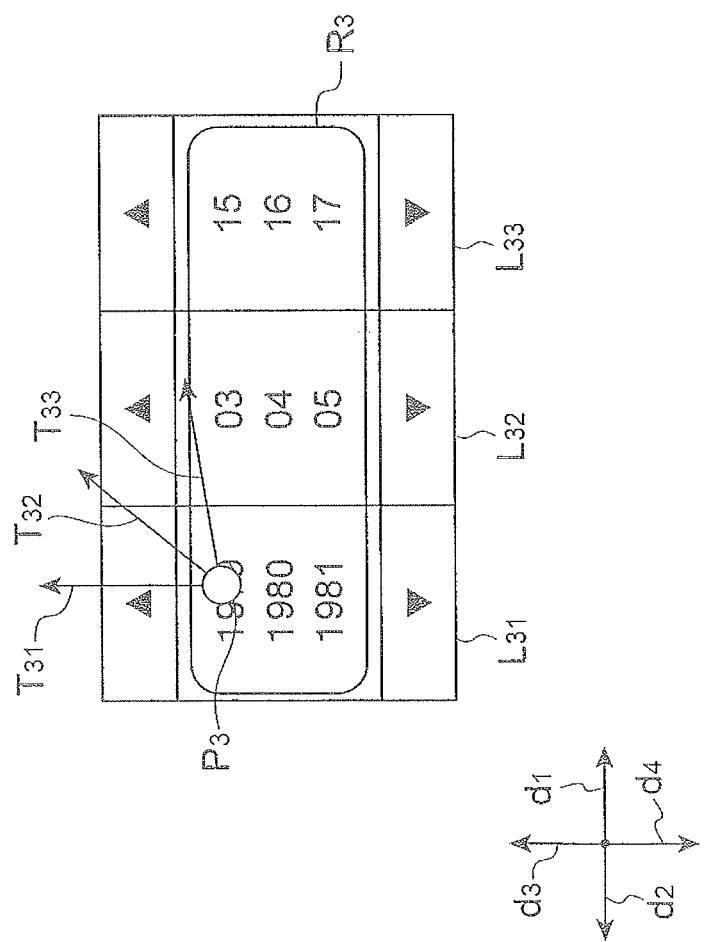
(b)
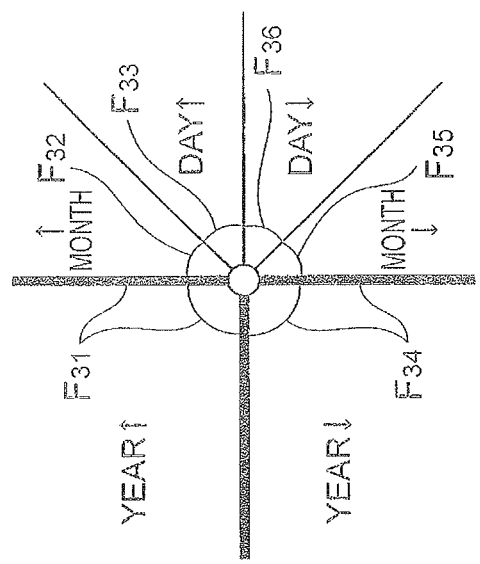

Fig. 7
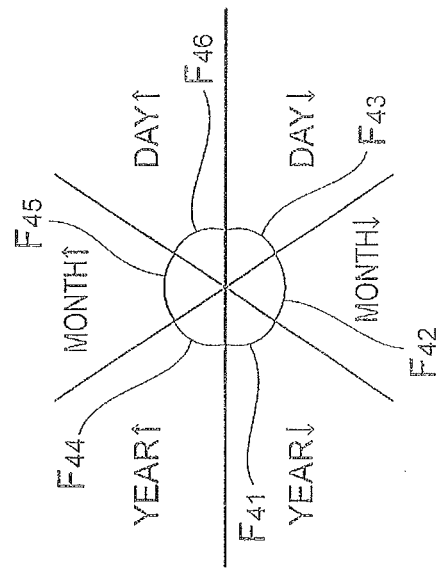
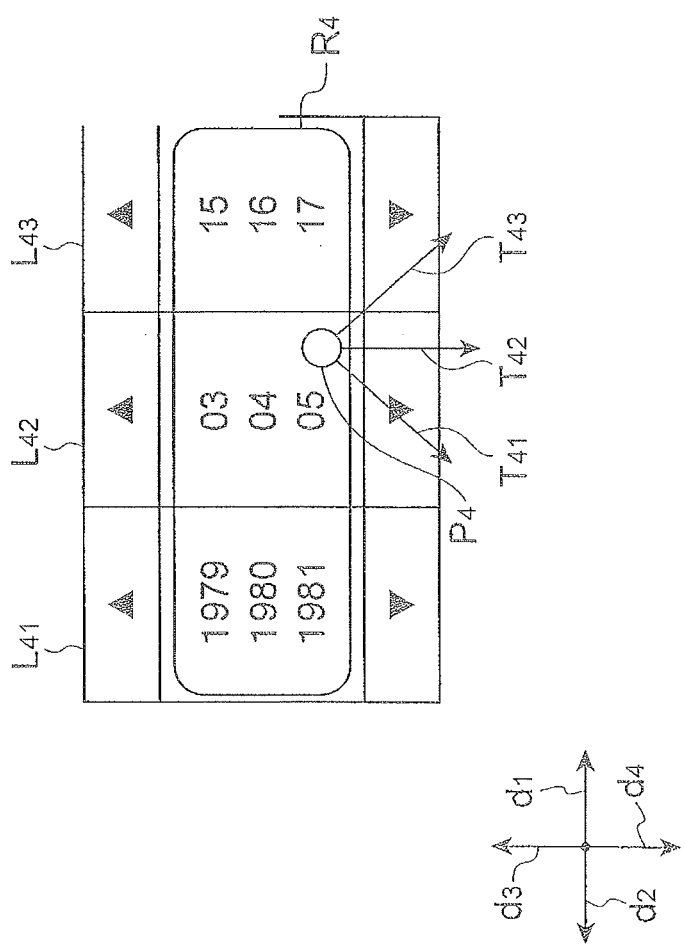

USING GESTURE DIRECTION TO INPUT DATA INTO MULTIPLE SPIN DIAL LIST BOXES

CROSS REFERENCE TO RELATED APPLICATIONS

This application is a National Stage of International Application No. PCT/JP2014/071043 filed Aug. 8, 2014, the contents of which are incorporated herein by reference in their entirety.

TECHNICAL FIELD

The present invention relates to a data input system, a data input method, a data input program, and a data input device.

BACKGROUND ART

A list box is the existing user interface for data selection and input. In the list box, a list of a plurality of preset possible choices is displayed, and one choice can be selected by sequentially changing the possible choices. For example, a user interface for making a menu choice by operating a selection menu in a list box is disclosed in Patent Literature 1.

CITATION LIST

Patent Literature

PTL 1: Japanese Unexamined Patent Application Publication No. 2001-282516

SUMMARY OF INVENTION

Technical Problem

In the list box according to the above Patent Literature, possible choices cannot be displayed or a choice cannot be made unless placing a pointer for input at a specified position. This is the same for the case where a touch on a touch panel is an input interface. In this manner, an operation to place a pointer at a specified position is troublesome.

In view of the above, an object of the present invention is to reduce the trouble of an operation for making a choice in a user interface with a list box.

Solution to Problem

To solve the above problem, a data input system according to one aspect of the present invention includes a display control means configured to display a plurality of list boxes configured to allow selection of one choice among a plurality of choices on a display screen, the plurality of list boxes placed side by side along a direction substantially orthogonal to a direction of receiving an input to change a choice selectable in each of the list boxes, and a processing control means configured to determine both a list box whose choice is to be changed among the plurality of list boxes and a direction of a change of a choice in the list box, based on a position of a point input in a region including the plurality of list boxes on the display screen and a direction of indication indicating a motion from the point as a starting point.

A data input method according to one aspect of the present invention is a data input method in a data input system, the method including a display control step of displaying a plurality of list boxes configured to allow selection of one choice among a plurality of choices on a display screen, the plurality of list boxes placed side by side along a direction substantially orthogonal to a direction of receiving an input to change a choice selectable in each of the list boxes, and a processing control step of determining both a list box whose choice is to be changed among the list boxes and a direction of a change of a choice in the list box, based on a position of a point input in a region including the plurality of list boxes on the display screen and a direction of indication indicating a motion from the point as a starting point.

A data input program according to one aspect of the present invention is a data input program for causing a computer to function as a data input system, the program causing the computer to implement a display control function to display a plurality of list boxes configured to allow selection of one choice among a plurality of choices on a display screen, the plurality of list boxes placed side by side along a direction substantially orthogonal to a direction of receiving an input to change a choice selectable in each of the list boxes, and a processing control function to determine both a list box whose choice is to be changed among the plurality of list boxes and a direction of a change of a choice in the list box, based on a position of a point input in a region including the plurality of list boxes on the display screen and a direction of indication indicating a motion from the point as a starting point.

A data input device according to one aspect of the present invention includes a display control means configured to display a plurality of list boxes configured to allow selection of one choice among a plurality of choices on a display screen, the plurality of list boxes placed side by side along a direction substantially orthogonal to a direction of receiving an input to change a choice selectable in each of the list boxes, and a processing control means configured to determine both a list box whose choice is to be changed among the plurality of list boxes and a direction of a change of a choice in the list box, based on a position of a point input in a region including the plurality of list boxes on the display screen and a direction of indication indicating a motion from the point as a starting point.

According to the above aspect, because both a list box whose choice is to be changed among a plurality of list boxes and the direction of a change of a choice in the list box are determined based on the position of a point that is input in a region including the plurality of list boxes on the display screen and the direction of indication indicating a motion from the point as a starting point, it is possible to change the choice displayed in any list box by operating any position in the region where the plurality of list boxes are displayed as the starting position. This reduces the trouble of setting an operation position at a specified position associated with one list box in order to change the choice displayed in the one list box among a plurality of list boxes.

In a data input device according to another aspect, the plurality of list boxes may be placed side by side along a first direction on the display screen, and the processing control means may determine correspondence between a list box whose choice is to be changed and an angle range of the direction of indication based on the number of list boxes placed in each of the first direction and a second direction opposite to the first direction viewed from a list box displayed containing the starting point.

According to the above aspect, the association between the angle range of the direction of indication and each list box can be determined so that a choice in the list box placed in the direction of indication is changed. A choice in the list box placed in the direction of indication is thereby changed, and it is thereby possible to provide an intuitive user interface.

In a data input device according to another aspect, the processing control means may divide angle ranges of substantially 180 degrees respectively including a third direction being one of directions of receiving an input to change a choice and substantially orthogonal to the first direction and a fourth direction being another one of directions of receiving an input to change a choice and opposite to the third direction at their center into the same number of parts as the number of list boxes, associate each of the divided angle ranges and each of the list boxes respectively according to an order of sequence, and determine a list box associated with the angle range including the direction of indication as a list box whose choice is to be changed.

According to the above aspect, the association between the angle range of the direction of indication and each list box is set so that a choice in the list box placed in the direction of indication is changed. A choice in the list box placed in the direction of indication is thereby changed, and it is thereby possible to provide an intuitive user interface.

In a data input device according to another aspect, when the direction of indication is along the third direction, the processing control means may change a choice in the list box displayed containing the starting point according to one order in a sequence of a plurality of choices, and when the direction of indication is along the fourth direction, the processing control means may change a choice in the list box displayed containing the starting point according to another order in a sequence of a plurality of choices.

According to the above aspect, in the case where a plurality of list boxes are placed side by side on the display screen, when an operation is performed so that the direction of indication is any of the upward direction and the downward direction, a choice of the list box displayed containing the starting point is changed according to one order or another order in a sequence of a plurality of choices. This enables an intuitive operation of a list box that is displayed at the position on which a touch is made.

In a data input device according to another aspect, when the direction of indication is along a direction inclined toward the first direction from the third direction, the processing control means may change a choice in any list box placed in the first direction viewed from the list box displayed containing the starting point according to one order in a sequence of a plurality of choices, when the direction of indication is along a direction inclined toward the first direction from the fourth direction, the processing control means may change a choice in any list box placed in the first direction viewed from the list box displayed containing the starting point according to another order in a sequence of a plurality of choices, when the direction of indication is along a direction inclined toward the second direction from the third direction, the processing control means may change a choice in any list box placed in the second direction viewed from the list box displayed containing the starting point according to one order in a sequence of a plurality of choices, and when the direction of indication is along a direction inclined toward the second direction from the fourth direction, the processing control means may change a choice in any list box placed in the second direction viewed from the list box displayed containing the starting point according to another order in a sequence of a plurality of choices.

According to the above aspect, in the case where a plurality of list boxes are placed side by side on the display screen, when an operation is performed so that the direction of indication is a direction inclined toward any of the leftward and rightward directions from any of the substantially upward direction and the substantially downward direction, a choice of the list box placed in the direction to which the direction of indication is inclined is changed. This enables an intuitive operation of list boxes placed on both sides of a list box that is displayed at the position on which a touch is made.

In a data input device according to another aspect, the processing control means may determine a list box whose choice is to be changed among the plurality of list boxes based on a duration of a press following the input of the starting point.

According to the above aspect, a target list box for an operation can be changed by altering the duration of a press following a touch, which enables an operation of a desired list box without depending on a slight change in the direction of indication. It is thereby possible to provide an intuitive user interface, allowing reduction of operating errors.

In a data input device according to another aspect, the processing control means may determine a list box placed at a longer distance from the list box displayed containing the starting point as a list box whose choice is to be changed as the duration is longer.

According to the above aspect, as the duration of a press is longer, a list box that is placed at a longer distance from the list box displayed at the position on which a touch is made is selected as a list box whose choice is to be changed, and it is thereby possible to specify a target list box for an operation in an intuitive manner.

In a data input device according to another aspect, the processing control means may change a list box whose choice is to be changed in a circular manner according to an order of sequence with an increase in the duration.

According to the above aspect, a list box whose choice is to be changed is varied in a circular manner according to an order of sequence according to the duration of a press. It is thereby possible to easily specify a target list box whose choice is to be changed.

In a data input device according to another aspect, the processing control means may recognize the direction of indication based on the starting point and one or more points input after the input of the starting point, and determine the amount of change of a choice in the list box based on a length from the starting point to a last point input among points used for the recognition of the direction of indication or based on a period of time from when the starting point is input to when a last point input among points used for the recognition of the direction of indication is input.

According to the above aspect, it is possible to adjust the amount of change of a choice in the list box by a simple operation for a user, such as the input at a starting point position and the adjustment of the following input operation for specifying the direction of indication. An intuitive user interface is thereby achieved.

Advantageous Effects of Invention

According to one aspect of the present invention, it is possible to reduce the trouble of an operation for making a choice in a user interface with a list box.

BRIEF DESCRIPTION OF DRAWINGS

FIG. 5 is a view illustrating processing to change, display and select a choice in a list box by a control unit.

FIG. 6 is a view illustrating processing to change, display and select a choice in a list box by a control unit.

FIG. 7 is a view illustrating processing to change, display and select a choice in a list box by a control unit.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
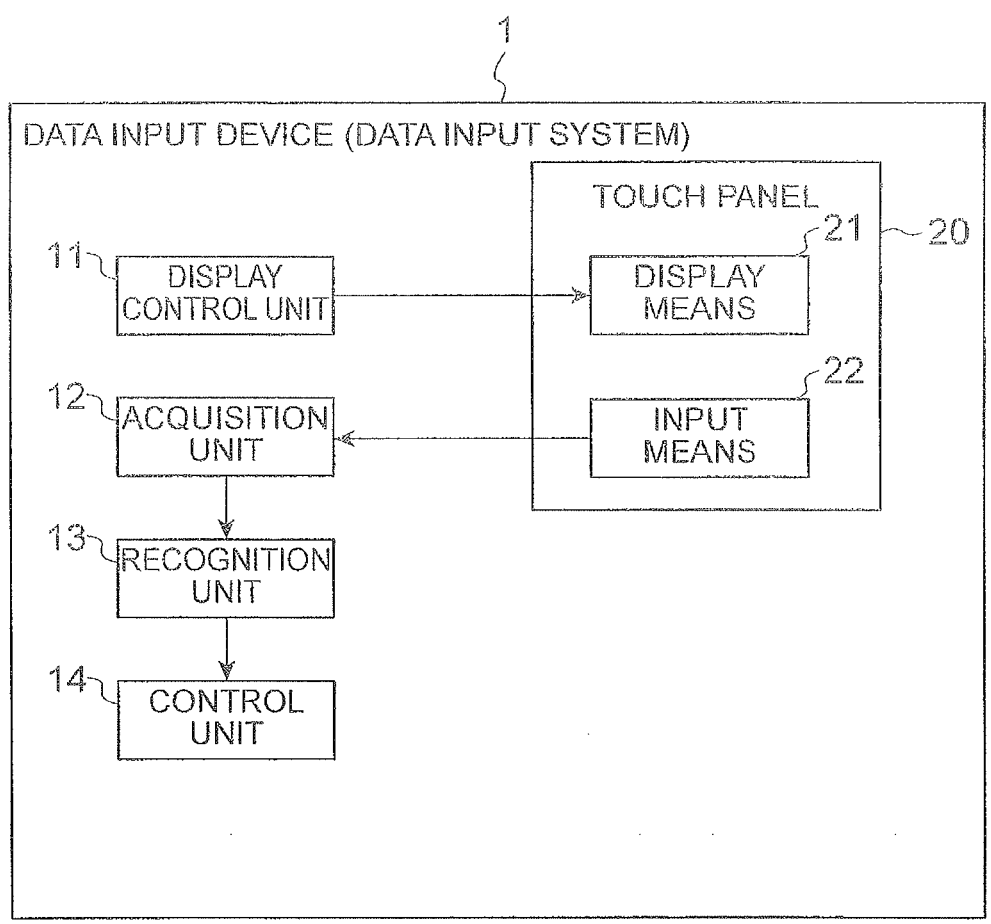
FIG. 1 is a block diagram showing a functional configuration of a data input device (data input system).

FIG. 1 is a block diagram showing a functional configuration of a data input device 1 according to this embodiment. The data input device 1 is an example of a device that constitutes a data input system, and it is a terminal with a touch panel 20, for example. The touch panel 20 includes a display means 21 and an input means 22. The display means 21 displays an image on a display screen. The input means 22 can detect physical contact on the display screen and output position information indicating a position at which physical contact on the display screen is detected.

The data input device 1 according to this embodiment is described using an example of a terminal with a touch panel. As shown in FIG. 1, the data input device 1 functionally includes a display control unit 11 (display control means), an acquisition unit 12 (processing control means), a recognition unit 13 (processing control means), and a control unit 14 (processing control means).

Figure 2:
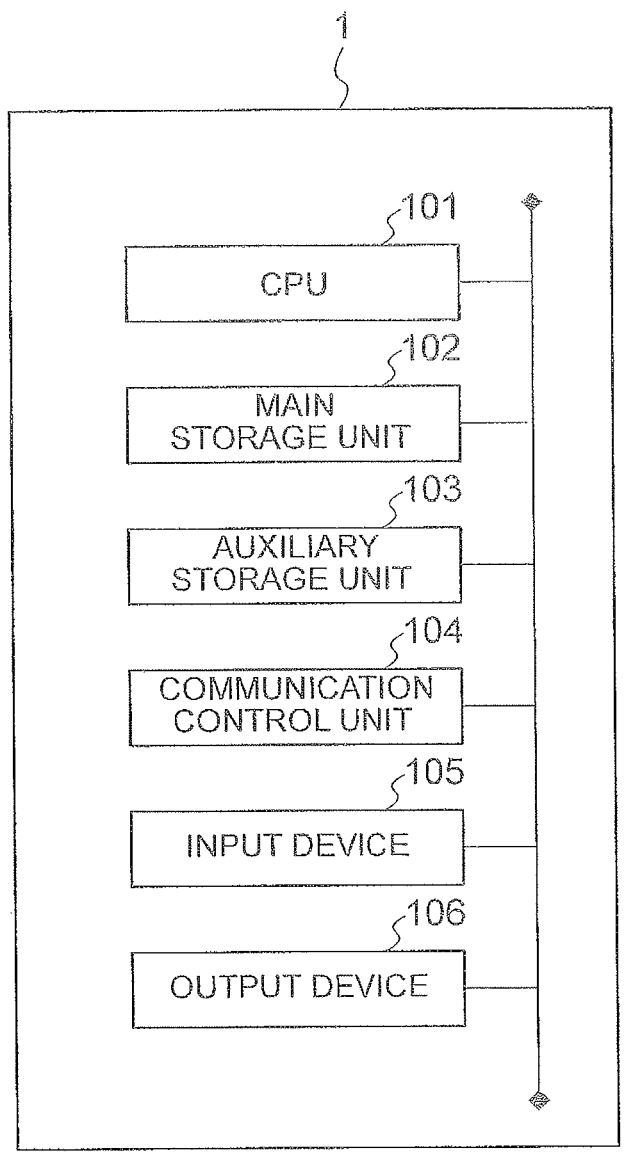
FIG. 2 is a view showing a hardware configuration of the data input device.

FIG. 2 is a view showing a hardware configuration of the data input device 1. As shown in FIG. 2, the data input device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 1 are implemented by loading given computer software (data input program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The display control unit 11 displays a plurality of list boxes on a display screen in the display means 21. The list box is one type of graphical user interface that is configured to allow selection of one choice among a plurality of choices. In this embodiment, a plurality of list boxes are placed side by side along the direction substantially orthogonal to the direction of receiving an input in order to change a choice selectable in each of the list boxes. In the list box, an input is made along a specified direction, and thereby a selectable choice changes one after another along a sequence of a plurality of choices.

An example of the input interface with a plurality of list boxes is the one with three list boxes placed side by side on a display screen where year, month and day can be selected in each list box for a user to input a date. In each list box, a value indicating each of year, month and day can be changed one after another along a sequence of values by a user operation.

Other examples are the input interface for setting time with two list boxes placed side by side where hour and minute can be selected in each list box, the input interface for inputting address with a plurality of list boxes placed side by side where prefecture, city, town and the like can be selected in each list box.

Figure 3:
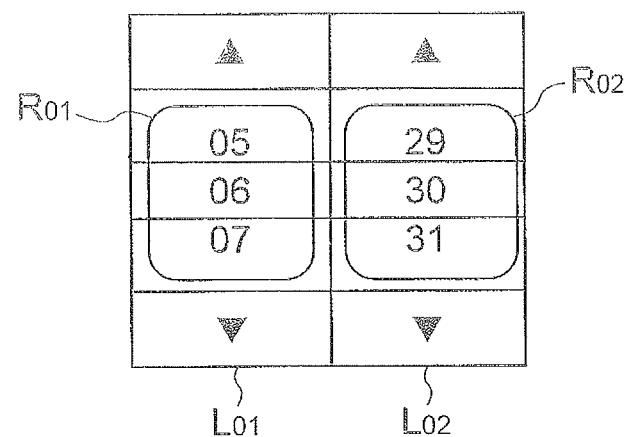
FIG. 3 is a view showing an example of a list box according to related art.

The existing list box is described with reference to FIG. 3. The example shown in FIG. 3 is the interface for inputting time, in which a list box $L_{01}$ for selecting hour and a list box $L_{02}$ for selecting minute are placed side by side. In such an example of related art, in order to change the choice for hour and display and select desired hour, it is necessary to perform an operation such as touch and swipe at an operation region $R_{01}$ set in the list box $L_{01}$. Further, in order to change the choice for minute and display and select desired minute, it is necessary to perform an operation such as touch and swipe at an operation region $R_{02}$ set in the list box $L_{02}$. In this manner, it is troublesome to set a position for an operation at a specified operation region.

Referring back to FIG. 1, the functional units of the data input device 1 are described. The acquisition unit 12 is a part that acquires position information indicating the position of an input operation on a display screen. To be specific, because position information indicating a position at which physical contact as an input operation on the display screen of the touch panel 20 is output from the input means 22, the acquisition unit 12 acquires the position information that is output from the input means 22.

The recognition unit 13 recognizes the position of a point that is input in a region containing a plurality of list boxes as a starting point based on the position information acquired by the acquisition unit 12, and further recognizes the direction of indication indicating a motion from the starting point based on the following input operation. For example, the recognition unit 13 acquires an input trajectory indicated by a set of position information based on a continuous input operation following the input of a starting point position and recognizes the direction of indication based on the acquired input trajectory. Further, the recognition unit 13 may acquire the position of a point that is input after the input of a starting point position and recognize the direction from the starting point position to the point input later as the direction of indication.

Figure 4:
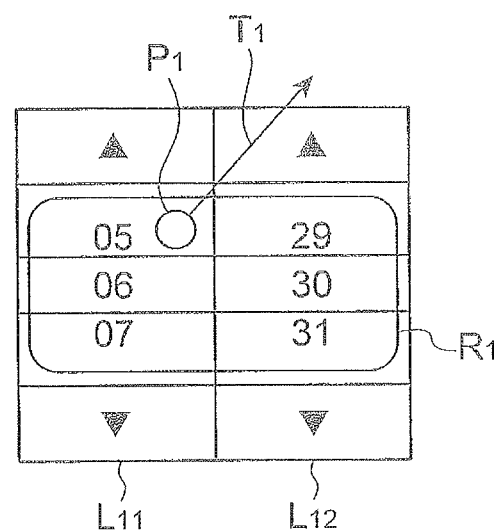
FIG. 4 is a view illustrating an example of recognition processing by a recognition unit.

The recognition processing by the recognition unit 13 is described with reference to FIG. 4. In the example shown in FIG. 4, a list box $L_{11}$ for selecting hour and a list box $L_{12}$ for selecting minute are placed side by side as the interface for inputting time. In the data input device 1 according to this embodiment, an operation region that includes a list box display region in which each list box is displayed is set as a region for making selection of a choice on a plurality of list boxes. In the example shown in FIG. 4, an operation region $R_1$ that includes a list box display region in which the list box $L_{11}$ and the list box $L_{12}$ are displayed is set.

When a touch is performed by a user in the operation region $R_1$, the recognition unit 13 recognizes the position of the touch as a starting point position $P_1$. Then, when a continuous input operation such as a swipe is performed by the user following the touch, the recognition unit 13 acquires the input trajectory indicated by a set of position information based on the continuous input operation and recognizes the direction of indication $T_1$ based on the input trajectory.

Referring back to FIG. 1, the functional units of the data input device 1 are described. The control unit 14 determines both a list box whose choice is to be changed among a plurality of list boxes and the direction of a change of a choice in the list box based on the position of the starting point and the direction of indication recognized by the recognition unit 13. Then, the control unit 14 displays the selected choice as a choice that is selectable in the list box.

The processing to change, display and select a choice by the control unit 14 is described with reference to FIG. 5. In the example shown in FIG. 5(a), a list box $L_{21}$ for selecting hour and a list box $L_{22}$ for selecting minute are placed side by side along a first direction $d_1$ on the display screen as the interface for inputting time. The first direction $d_1$ is the rightward direction on the display screen, for example. Further, in FIG. 5, the direction opposite to the first direction $d_1$ is a second direction $d_2$, the direction substantially orthogonal to the first direction $d_1$ is a third direction $d_3$, and the direction opposite to the third direction $d_3$ is a fourth direction $d_4$. The second direction $d_2$ is the leftward direction on the display screen, for example. The third direction $d_3$ is the upward direction on the display screen, for example. The fourth direction $d_4$ is the downward direction on the display screen, for example.

When a touch is performed by a user in the operation region $R_2$ that includes the list box $L_{21}$ and the list box $L_{22}$, and a starting point position $P_2$ is recognized by the recognition unit 13, the control unit 14 determines the correspondence between the list box whose choice is to be changed and the range of angles of the direction of indication based on the number of list boxes placed in each of the first direction $d_1$ and the second direction $d_2$ viewed from the list box $L_{21}$ that is displayed containing the starting point position $P_2$.

In FIG. 5(a), one list box is placed in the first direction $d_1$ viewed from the list box $L_{21}$, and no list box is placed in the second direction $d_2$ viewed from the list box $L_{21}$, and therefore the control unit 14 associates the angle range $F_{21}$ of the direction of indication that is recognized following the recognition of the starting point position $P_2$ with a change to the direction of increasing the value of the choice of hour in the list box $L_{21}$ as shown in FIG. 5(b). Further, the control unit 14 associates the angle range $F_{22}$ of the direction of indication with a change to the direction of increasing the value of the choice of minute in the list box $L_{22}$, associates the angle range $F_{23}$ of the direction of indication with a change to the direction of reducing the value of the choice of hour in the list box $L_{21}$, and associates the angle range $F_{24}$ of the direction of indication with a change to the direction of reducing the value of the choice of minute in the list box $L_{22}$. Note that the angle range $F_{21}$ includes the third direction $d_3$ as indicated by the heavy line, and the angle range $F_{22}$ does not include the third direction $d_3$. Further, the angle range $F_{23}$ includes the fourth direction $d_4$ as indicated by the heavy line, and the angle range $F_{24}$ does not include the fourth direction $d_4$.

In other words, the control unit 14 divides each angle range of substantially 180 degrees including the third direction or the fourth direction in its center into the same number of parts as the number of list boxes, associates the divided angle ranges and each of the list boxes according to the order of their sequence and determines the list box associated with the angle range including the direction of indication as the list box whose choice is to be changed.

To be more specific, the control unit 14 divides the angle range of substantially 180 degrees including the third direction in its center into two, which is the number of list boxes, and associates the divided angle ranges $F_{21}$ and $F_{22}$ with the list boxes $L_{21}$ and $L_{22}$ respectively according to the order of their sequence. When the direction of indication is included in the angle range $F_{21}$, the choice in the list box $L_{21}$ is changed to the direction of increasing the value, and when the direction of indication is included in the angle range $F_{22}$, the choice in the list box $L_{22}$ is changed to the direction of increasing the value.

Further, the control unit 14 divides the angle range of substantially 180 degrees including the fourth direction in its center into two, which is the number of list boxes, and associates the divided angle ranges $F_{23}$ and $F_{24}$ with the list boxes $L_{21}$ and $L_{22}$ respectively according to the order of their sequence. When the direction of indication is included in the angle range $F_{23}$, the choice in the list box $L_{21}$ is changed to the direction of reducing the value, and when the direction of indication is included in the angle range $F_{24}$, the choice in the list box $L_{22}$ is changed to the direction of reducing the value.

As shown in FIG. 5(a), when the direction of indication $T_{21}$ along the third direction $d_3$ is recognized by the recognition unit 13, the control unit 14 changes the choice in the list box $L_{21}$ that is displayed containing the starting point position $P_2$ to the direction of increasing the value. On the other hand, when the direction of indication along the fourth direction $d_4$ is recognized by the recognition unit 13, the control unit 14 changes the choice in the list box $L_{21}$ that is displayed containing the starting point position $P_2$ to the direction of reducing the value.

Further, when the direction of indication $T_{22}$ along the direction that is inclined toward the first direction $d_1$ from the third direction $d_3$ is recognized by the recognition unit 13, the control unit 14 changes the choice in the list box $L_{22}$ that is placed in the first direction $d_1$ when viewed from the list box $L_{21}$ that is displayed containing the starting point position $P_2$ to the direction of increasing the value. On the other hand, when the input trajectory along the direction that is inclined toward the first direction $d_1$ from the fourth direction $d_4$ is recognized, the control unit 14 changes the choice in the list box $L_{22}$ that is placed in the first direction $d_1$ when viewed from the list box $L_{21}$ that is displayed containing the starting point position $P_2$ to the direction of reducing the value.

The determination of the list box whose choice is to be changed is further described below. In the example shown in FIG. 5, the list boxes are placed along the first direction $d_1$. When the x-axis is in the first direction $d_1$ and the y-axis is in the third direction, the list boxes are placed along the x-axis direction, and therefore the list box whose choice is to be changed is determined based on the x-coordinate of the starting point position and a change in the x-coordinate of the vector indicating the direction of indication. Note that, when the list boxes are placed along the y-axis direction, the list box whose choice is to be changed is determined based on the y-coordinate of the starting point position and a change in the y-coordinate of the vector indicating the direction of indication. Such relationship between the direction of placing the list boxes and the coordinates of the starting point position and the direction of indication used for determination of the list box whose choice is to be changed is the same in the examples described hereinbelow.

Further, the control unit 14 recognizes the direction of indication based on the starting point and one or more points input after the input of the starting point, and determines the amount of change of a choice in the list box based on the length from the starting point to the last point input among the points used for the recognition of the direction of indication or based on the time from when the starting point is input to when the last point input among the points used for the recognition of the direction of indication is input. To be specific, in the case of recognizing the direction of indication based on the input trajectory following the input of the starting point, the control unit 14 increases the amount of change of a choice as the length of the input trajectory is longer or the moving speed of the input position is higher. Further, in the case of acquiring the position of the point input after the input of the starting point position and recognizing the direction from the starting point position to the point input later as the direction of indication, the control unit 14 increases the amount of change of a choice as the distance between the two points used for the recognition of the direction of indication is longer or as the interval between the times of inputting the two points is closer. In the example shown in FIG. 5, the control unit 14 determines the amount of change to the direction of increasing the value of a choice in the list box $L_{21}$ based on the length of the input trajectory used for the recognition of the direction of indication $T_{21}$ or the moving speed of the input position when the input trajectory is input. Further, the control unit 14 determines the amount of change to the direction of increasing the value of a choice in the list box $L_{22}$ based on the length of the input trajectory used for the recognition of the direction of indication $T_{22}$ or the moving speed of the input position when the input trajectory is input.

The processing to change, display and select a choice by the control unit 14 is described with reference to FIG. 6. In the example shown in FIG. 6(a), a list box $L_{31}$ for selecting year, a list box $L_{32}$ for selecting month, and a list box $L_{33}$ for selecting day are placed side by side along a first direction $d_1$ on the display screen as the interface for inputting date. The first direction $d_1$ is the rightward direction on the display screen, for example. Further, in FIG. 6, the direction opposite to the first direction $d_1$ is a second direction $d_2$, the direction substantially orthogonal to the first direction $d_1$ is a third direction $d_3$, and the direction opposite to the third direction $d_3$ is a fourth direction $d_4$. The second direction $d_2$ is the leftward direction on the display screen, for example. The third direction $d_3$ is the upward direction on the display screen, for example. The fourth direction $d_4$ is the downward direction on the display screen, for example.

When a touch is performed by a user in an operation region $R_3$ that includes the list box $L_{31}$, the list box $L_{32}$ and the list box $L_{33}$, and a starting point position $P_3$ is recognized by the recognition unit 13, the control unit 14 determines the correspondence between the list box whose choice is to be changed and the range of angles of the direction of indication based on the number of list boxes placed in each of the first direction $d_1$ and the second direction $d_2$ viewed from the list box $L_{31}$ that is displayed containing the starting point position $P_3$.

In FIG. 6(a), two list boxes are placed in the first direction $d_1$ viewed from the list box $L_{31}$, and no list box is placed in the second direction $d_2$ viewed from the list box $L_{31}$, and therefore the control unit 14 associates the angle range $F_{31}$ of the direction of indication following the recognition of the starting point position $P_3$ with a change to the direction of increasing the value of the choice of year in the list box $L_{31}$ as shown in FIG. 6(b). Further, the control unit 14 associates the angle range $F_{32}$ of the direction of indication with a change to the direction of increasing the value of the choice of month in the list box $L_{32}$, associates the angle range $F_{33}$ of the direction of indication with a change to the direction of increasing the value of the choice of day in the list box $L_{33}$, associates the angle range $F_{34}$ of the direction of indication with a change to the direction of reducing the value of the choice of year in the list box $L_{31}$, associates the angle range $F_{35}$ of the direction of indication with a change to the direction of reducing the value of the choice of month in the list box $L_{32}$, and associates the angle range $F_{36}$ of the direction of indication with a change to the direction of reducing the value of the choice of day in the list box $L_{33}$. Note that the angle range $F_{31}$ includes the third direction $d_3$ as indicated by the heavy line, and the angle range $F_{32}$ does not include the third direction $d_3$. Further, the angle range $F_{34}$ includes the fourth direction $d_4$ as indicated by the heavy line, and the angle range $F_{35}$ does not include the fourth direction $d_4$.

To be more specific, the control unit 14 divides the angle range of substantially 180 degrees including the third direction in its center into three, which is the number of list boxes, and associates the divided angle ranges $F_{31}$, $F_{32}$, and $F_{33}$ with the list boxes $L_{31}$, $L_{32}$ and $L_{33}$ respectively according to the order of their sequence.

The list box $L_{31}$ that has the starting point position $P_3$ in the list box display region and is placed on the leftmost side is associated with the angle range $F_{31}$ of substantially 90 degrees ranging from the second direction $d_2$ to the third direction $d_3$ and including the third direction $d_3$. The list box $L_{32}$ that is placed on the right side of the list box $L_{31}$ is associated with the angle range $F_{32}$ of substantially 45 degrees ranging from the third direction $d_3$ to the first direction $d_1$. The list box $L_{33}$ that is placed on the right side of the list box $L_{32}$ is associated with the angle range $F_{33}$ of substantially 45 degrees ranging from the boundary of the angle range $F_{32}$ on the side of the first direction $d_1$ to the first direction $d_1$. In this manner, by associating each list box and the angle range of the direction of indication, the direction of indication and the list box on which a change in choice is to be made are associated with each other in an intuitive way.

When the direction of indication is included in the angle range $F_{31}$, the choice in the list box $L_{31}$ is changed to the direction of increasing the value, when the direction of indication is included in the angle range $F_{32}$, the choice in the list box $L_{32}$ is changed to the direction of increasing the value, and when the direction of indication is included in the angle range $F_{33}$, the choice in the list box $L_{33}$ is changed to the direction of increasing the value.

Further, the control unit 14 divides the angle range of substantially 180 degrees including the fourth direction in its center into three, which is the number of list boxes, and associates the divided angle ranges $F_{34}$, $F_{35}$, and $F_{36}$ with the list boxes $L_{31}$, $L_{32}$ and $L_{33}$ respectively according to the order of their sequence.

The list box $L_{31}$ that has the starting point position $P_3$ in the list box display region and is placed on the leftmost side is associated with the angle range $F_{34}$ of substantially 90 degrees ranging from the second direction $d_2$ to the fourth direction $d_4$ and including the fourth direction $d_4$. The list box $L_{32}$ that is placed on the right side of the list box $L_{31}$ is associated with the angle range $F_{35}$ of substantially 45 degrees ranging from the fourth direction $d_4$ to the first direction $d_1$. The list box $L_{33}$ that is placed on the right side of the list box $L_{32}$ is associated with the angle range $F_{36}$ of substantially 45 degrees ranging from the boundary of the angle range $F_{35}$ on the side of the first direction $d_1$ to the first direction $d_1$. In this manner, by associating each list box and the angle range of the direction of indication, the direction of indication and the list box on which a change in choice is to be made are associated with each other in an intuitive way.

When the direction of indication is included in the angle range $F_{34}$, a choice in the list box $L_{31}$ is changed to the direction of reducing the value, when the direction of indication is included in the angle range $F_{35}$, a choice in the list box $L_{32}$ is changed to the direction of reducing the value, and when the direction of indication is included in the angle range $F_{36}$, a choice in the list box $L_{33}$ is changed to the direction of reducing the value.

As shown in FIG. 6(a), when the direction of indication $T_{31}$ along the third direction $d_3$ is recognized by the recognition unit 13, the control unit 14 changes the choice in the list box $L_{31}$ that is displayed containing the starting point position $P_3$ to the direction of increasing the value. On the other hand, when the direction of indication along the fourth direction $d_4$ is recognized by the recognition unit 13, the control unit 14 changes the choice in the list box $L_{31}$ that is displayed containing the starting point position $P_3$ to the direction of reducing the value.

Further, when the direction of indication $T_{32}$ or $T_{33}$ along the direction that is inclined toward the first direction $d_1$ from the third direction $d_3$ is recognized by the recognition unit 13, the control unit 14 changes the choice in the list box $L_{32}$ or $L_{33}$ that is placed in the first direction $d_1$ when viewed from the list box $L_{31}$ that is displayed containing the starting point position $P_3$ to the direction of increasing the value. Because the direction of indication $T_{32}$ is included in the angle range $F_{32}$, when the direction of indication $T_{32}$ is recognized, the control unit 14 changes the choice in the list box $L_{32}$ to the direction of increasing the value. Because the direction of indication $T_{33}$ is included in the angle range $F_{33}$, when the direction of indication $T_{33}$ is recognized, the control unit 14 changes the choice in the list box $L_{33}$ to the direction of increasing the value. On the other hand, when the input trajectory along the direction that is inclined toward the first direction $d_1$ from the fourth direction $d_4$ is recognized by the recognition unit 13, the control unit 14 changes the choice in the list box $L_{32}$ or $L_{33}$ that is placed in the first direction $d_1$ when viewed from the list box $L_{31}$ that is displayed containing the starting point position $P_3$ to the direction of reducing the value. When the recognized direction of indication is included in the angle range $F_{35}$, the control unit 14 changes the choice in the list box $L_{32}$ to the direction of reducing the value. When the recognized direction of indication is included in the angle range $F_{36}$, the control unit 14 changes the choice in the list box $L_{33}$ to the direction of reducing the value.

Further, the control unit 14 determines the amount of change to the direction of increasing the value of the choice in the list box $L_{31}$ based on the length of the input trajectory used for the recognition of the direction of indication $T_{31}$ or the moving speed of the input position when the input trajectory is input. The control unit 14 determines the amount of change to the direction of increasing the value of the choice in the list box $L_{32}$ based on the length of the input trajectory used for the recognition of the direction of indication $T_{32}$ or the moving speed of the input position when the input trajectory is input. The control unit 14 determines the amount of change to the direction of increasing the value of the choice in the list box $L_{33}$ based on the length of the input trajectory used for the recognition of the direction of indication $T_{33}$ or the moving speed of the input position when the input trajectory is input.

The processing to change, display and select a choice by the control unit 14 is described with reference to FIG. 7. In the example shown in FIG. 7(a), a list box $L_{41}$ for selecting year, a list box $L_{42}$ for selecting month, and a list box $L_{43}$ for selecting day are placed side by side along a first direction $d_1$ on the display screen as the interface for inputting date. The first direction $d_1$ is the rightward direction on the display screen, for example. Further, in FIG. 7, the direction opposite to the first direction $d_1$ is a second direction $d_2$, the direction substantially orthogonal to the first direction $d_1$ is a third direction $d_3$, and the direction opposite to the third direction $d_3$ is a fourth direction $d_4$. The second direction $d_2$ is the leftward direction on the display screen, for example. The third direction $d_3$ is the upward direction on the display screen, for example. The fourth direction $d_4$ is the downward direction on the display screen, for example.

When a touch is performed by a user in an operation region $R_4$ that includes the list box $L_{41}$, the list box $L_{42}$ and the list box $L_{43}$, and a starting point position $P_4$ is recognized by the recognition unit 13, the control unit 14 determines the correspondence between the list box whose choice is to be changed and the range of angles of the direction of indication based on the number of list boxes placed in each of the first direction $d_1$ and the second direction $d_2$ viewed from the list box $L_{42}$ that is displayed containing the starting point position $P_4$.

In FIG. 7(a), one list box is placed in the first direction $d_1$ viewed from the list box $L_{42}$, and one list box is placed in the second direction $d_2$ viewed from the list box $L_{42}$, and therefore the control unit 14 associates the angle range $F_{44}$ of the direction of indication following the recognition of the starting point position $P_4$ with a change to the direction of increasing the value of the choice of year in the list box $L_{41}$ as shown in FIG. 7(b). Further, the control unit 14 associates the angle range $F_{45}$ of the direction of indication with a change to the direction of increasing the value of the choice of month in the list box $L_{42}$ associates the angle range $F_{46}$ of the direction of indication with a change to the direction of increasing the value of the choice of day in the list box $L_{43}$, associates the angle range $F_{41}$ of the direction of indication with a change to the direction of reducing the value of the choice of year in the list box $L_{41}$, associates the angle range $F_{42}$ of the direction of indication with a change to the direction of reducing the value of the choice of month in the list box $L_{42}$, and associates the angle range $F_{43}$ of the direction of indication with a change to the direction of reducing the value of the choice of day in the list box $L_{43}$.

To be more specific, the control unit 14 divides the angle range of substantially 180 degrees including the third direction in its center into three, which is the number of list boxes, and associates the divided angle ranges $F_{44}$, $F_{45}$, and $F_{46}$ with the list boxes $L_{41}$, $L_{42}$ and $L_{43}$ respectively according to the order of their sequence.

The list box $L_{42}$ that has the starting point position $P_4$ in the list box display region and is placed at the center of the three list boxes is associated with the angle range $F_{45}$ of substantially 60 degrees including the third direction $d_3$ in its center. The list box $L_{41}$ that is placed on the left side of the list box $L_{42}$ is associated with the angle range $F_{44}$ of substantially 60 degrees ranging from the boundary of the angle range $F_{45}$ on the side of the second direction $d_2$ to the second direction $d_2$. The list box $L_{43}$ that is placed on the right side of the list box $L_{42}$ is associated with the angle range $F_{46}$ of substantially 60 degrees ranging from the boundary of the angle range $F_{45}$ on the side of the first direction $d_1$ to the first direction $d_1$. In this manner, by associating each list box and the angle range of the direction of indication, the direction of indication and the list box on which a change in choice is to be made are associated with each other in an intuitive way.

When the direction of indication is included in the angle range $F_{44}$, the choice in the list box $L_{41}$ is changed to the direction of increasing the value, when the direction of indication is included in the angle range $F_{45}$, the choice in the list box $L_{42}$ is changed to the direction of increasing the value, and when the direction of indication is included in the angle range $F_{46}$, the choice in the list box $L_{43}$ is changed to the direction of increasing the value.

Further, the control unit 14 divides the angle range of substantially 180 degrees including the fourth direction in its center into three, which is the number of list boxes, and associates the divided angle ranges $F_{41}$, $F_{42}$, and $F_{43}$ with the list boxes $L_{41}$, $L_{42}$ and $L_{43}$ respectively according to the order of their sequence.

The list box $L_{42}$ that has the starting point position $P_4$ in the list box display region and is placed at the center of the three list boxes is associated with the angle range $F_{42}$ of substantially 60 degrees including the fourth direction $d_4$ in its center. The list box $L_{41}$ that is placed on the left side of the list box $L_{42}$ is associated with the angle range $F_{41}$ of substantially 60 degrees ranging from the boundary of the angle range $F_{42}$ on the side of the second direction $d_2$ to the second direction $d_2$. The list box $L_{43}$ that is placed on the right side of the list box $L_{42}$ is associated with the angle range $F_{43}$ of substantially 60 degrees ranging from the boundary of the angle range $F_{42}$ on the side of the first direction $d_1$ to the first direction $d_1$. In this manner, by associating each list box and the angle range of the direction of indication, the direction of indication and the list box on which a change in choice is to be made are associated with each other in an intuitive way.

When the direction of indication is included in the angle range $F_{41}$, the choice in the list box $L_{41}$ is changed to the direction of reducing the value, when the direction of indication is included in the angle range $F_{42}$, the choice in the list box $L_{42}$ is changed to the direction of reducing the value, and when the direction of indication is included in the angle range $F_{43}$, the choice in the list box $L_{43}$ is changed to the direction of reducing the value.

As shown in FIG. 7(a), when the direction of indication $T_{42}$ along the fourth direction $d_4$ is recognized by the recognition unit 13, the control unit 14 changes the choice in the list box $L_{42}$ that is displayed containing the starting point position $P_4$ to the direction of reducing the value. On the other hand, when the direction of indication along the third direction $d_3$ is recognized by the recognition unit 13, the control unit 14 changes the choice in the list box $L_{42}$ that is displayed containing the starting point position $P_4$ to the direction of increasing the value.

When the direction of indication along the direction that is inclined toward the first direction $d_1$ from the third direction $d_3$ and that is included in the angle range $F_{46}$ is recognized by the recognition unit 13, the control unit 14 changes the choice in the list box $L_{43}$ that is placed in the first direction $d_1$ when viewed from the list box $L_{42}$ that is displayed containing the starting point position $P_4$ to the direction of increasing the value. Further, when the direction of indication along the direction that is inclined toward the second direction $d_2$ from the third direction $d_3$ and that is included in the angle range $F_{44}$ is recognized, the control unit 14 changes the choice in the list box $L_{41}$ that is placed in the second direction $d_2$ when viewed from the list box $L_{42}$ that is displayed containing the starting point position $P_4$ to the direction of increasing the value.

On the other hand, when the direction of indication $T_{43}$ along the direction that is inclined toward the first direction $d_1$ from the fourth direction $d_4$ and that is included in the angle range $F_{43}$ is recognized by the recognition unit 13, the control unit 14 changes the choice in the list box $L_{43}$ that is placed in the first direction $d_1$ when viewed from the list box $L_{42}$ that is displayed containing the starting point position $P_4$ to the direction of reducing the value. Further, when the direction of indication $T_{41}$ along the direction that is inclined toward the second direction $d_2$ from the fourth direction $d_4$ and that is included in the angle range $F_{41}$ is recognized, the control unit 14 changes the choice in the list box $L_{41}$ that is placed in the second direction $d_2$ when viewed from the list box $L_{42}$ that is displayed containing the starting point position $P_4$ to the direction of reducing the value.

Further, the control unit 14 determines the amount of change to the direction of reducing the value of the choice in the list box $L_{41}$ based on the length of the input trajectory used for the recognition of the direction of indication $T_{41}$ or the moving speed of the input position when the input trajectory is input. The control unit 14 determines the amount of change to the direction of reducing the value of the choice in the list box $L_{42}$ based on the length of the input trajectory used for the recognition of the direction of indication $T_{42}$ or the moving speed of the input position when the input trajectory is input. The control unit 14 determines the amount of change to the direction of reducing the value of the choice in the list box $L_{43}$ based on the length of the input trajectory used for the recognition of the direction of indication $T_{43}$ or the moving speed of the input position when the input trajectory is input.

Figure 8:
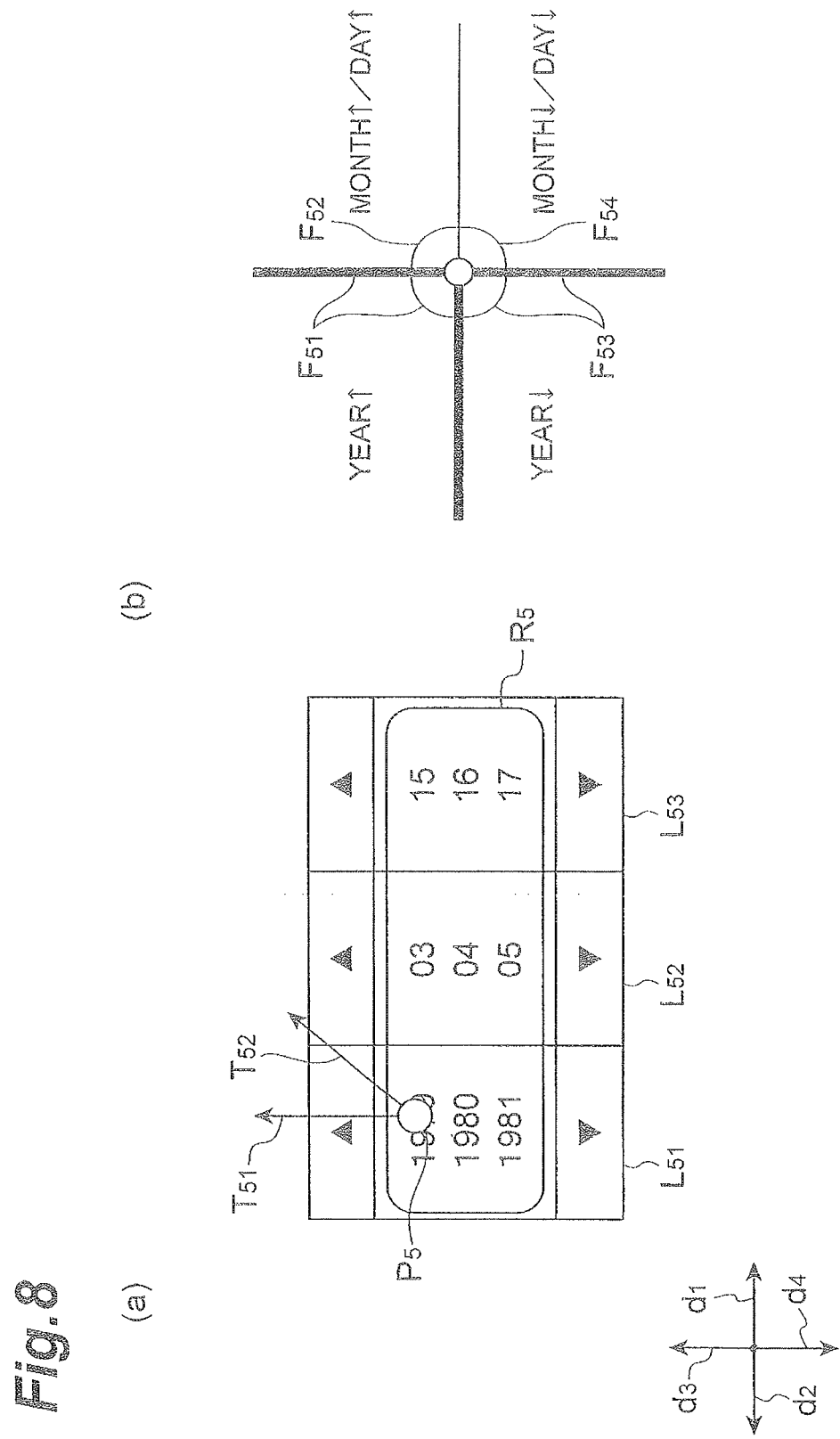
FIG. 8 is a view illustrating processing to change, display and select a choice in a list box by a control unit.

The processing to change, display and select a choice by the control unit 14 is described with reference to FIG. 8. In the example shown in FIG. 8(a), a list box $L_{51}$ for selecting year, a list box $L_{52}$ for selecting month, and a list box $L_{53}$ for selecting day are placed side by side along a first direction $d_1$ on the display screen as the interface for inputting date. The first direction $d_1$ is the rightward direction on the display screen, for example. Further, in FIG. 8, the direction opposite to the first direction $d_1$ is a second direction $d_2$, the direction substantially orthogonal to the first direction $d_1$ is a third direction $d_3$, and the direction opposite to the third direction $d_3$ is a fourth direction $d_4$. The second direction $d_2$ is the leftward direction on the display screen, for example. The third direction $d_3$ is the upward direction on the display screen, for example. The fourth direction $d_4$ is the downward direction on the display screen, for example.

When a touch is performed by a user in an operation region $R_5$ that includes the list box $L_{51}$, the list box $L_{52}$ and the list box $L_{53}$, and a starting point position $P_5$ is recognized by the recognition unit 13, the control unit 14 determines the correspondence between the list box whose choice is to be changed and the range of angles of the direction of indication based on the number of list boxes placed in each of the first direction $d_1$ and the second direction $d_2$ viewed from the list box $L_{51}$ that is displayed containing the starting point position $P_5$.

In FIG. 8(a), two list boxes are placed in the first direction $d_1$ viewed from the list box $L_{51}$, and no list box is placed in the second direction $d_2$ viewed from the list box $L_{51}$, and therefore the control unit 14 associates the list box $L_{51}$ that has the starting point position $P_5$ in the list box display region and is placed on the leftmost side with the angle range $F_{51}$ of substantially 90 degrees ranging from the second direction $d_2$ to the third direction $d_3$ and including the third direction $d_3$ out of the angle range of substantially 180 degrees including the third direction in its center as shown in FIG. 8(b). Further, the control unit 14 associates the list boxes $L_{52}$ and $L_{53}$ that are placed on the right side of the list box $L_{51}$ with the angle range $F_{52}$ of substantially 90 degrees ranging from the third direction $d_3$ to the first direction $d_1$ out of the angle range of substantially 180 degrees including the third direction in its center.

When a plurality of list boxes are associated with one angle range, the control unit 14 can determine the list box whose choice is to be changed among the plurality of list boxes based on the duration of a press following a touch on the starting point position by a user. In this case, the recognition unit 13 can recognize the duration of a press following a touch on the starting point position by a user.

For example, as the duration of a press is longer, the control unit 14 may determine the list box that is placed at a longer distance from the list box displayed containing the starting point as the list box whose choice is to be changed.

To be specific, when the duration of a press at the starting point position $P_5$ is a short press, which is shorter than a specified time, the control unit 14 determines the list box $L_{52}$ at a shorter distance from the list box $L_{51}$ that is displayed containing the starting point position $P_5$ as the list box whose choice is to be changed. On the other hand, when the duration of a press at the starting point position $P_5$ is a long press, which is longer than a specified time, the control unit 14 determines the list box $L_{53}$ at a longer distance from the list box $L_{51}$ that is displayed containing the starting point position $P_5$ as the list box whose choice is to be changed.

Specifically, when a user performs a swipe indicated by the direction of indication $T_{52}$ after a short press on the starting point position $P_5$, the control unit 14 determines the list box $L_{52}$ as the list box whose choice is to be changed, and changes the display of month shown in the list box $L_{52}$ to the direction of increasing the value according to the length of the input trajectory indicating the direction of indication $T_{52}$ or the moving speed of the input position when the input trajectory is input. On the other hand, when a user performs a swipe indicated by the direction of indication $T_{52}$ after a long press on the starting point position $P_5$, the control unit 14 determines the list box $L_{53}$ as the list box whose choice is to be changed, and changes the display of day shown in the list box $L_{53}$ to the direction of increasing the value according to the length of the input trajectory indicating the direction of indication $T_{53}$ or the moving speed of the input position when the input trajectory is input.

Note that, although the list box that is placed at a longer distance from the list box displayed containing the starting point is determined as the list box whose choice is to be changed as the duration of a press at the starting point position is longer in the above example described with reference to FIG. 8, the control unit 14 may change the list box whose choice is to be changed in a circular manner according to the order of sequence with an increase in the duration of a press at the starting point position. To be specific, the control unit 14 may make a change in the list box whose choice is to be changed from the list box $L_{52}$ to the list box $L_{53}$ and from the list box $L_{53}$ to the list box $L_{52}$ repeatedly each time the duration of a press at the starting point position $P_5$ reaches a predetermined period.

Figure 9:
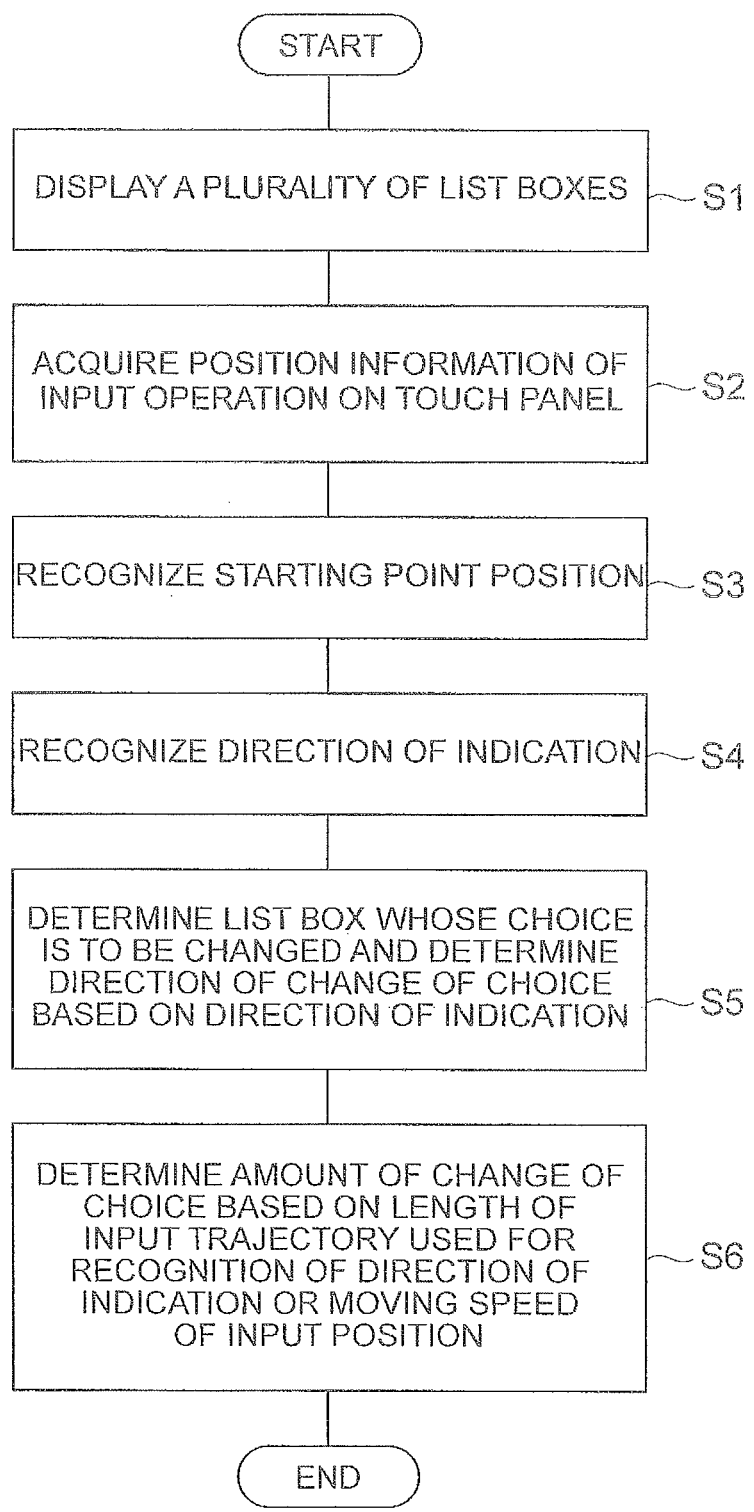
FIG. 9 is a flowchart showing a process in a data input system.

The operation of the data input device 1 according to this embodiment is described hereinafter with reference to FIG. 9. FIG. 9 is a flowchart showing a process of a data input method that is performed in the data input device 1.

First, the display control unit 11 displays a plurality of list boxes on a display screen in the display means 21 in such a way that they are placed side by side along the direction substantially orthogonal to the direction of receiving an input to change the choice selectable in each of the list boxes (S1). Next, the acquisition unit 12 acquires position information indicating the position of an input operation on the display screen on the touch panel (S2).

Then, the recognition unit 13 recognizes the position of a touch in the operation region that includes the list boxes as a starting point position based on the position information acquired by the acquisition unit 12 (S3). The recognition unit 13 then recognizes the direction of indication based on an input operation following the touch at the starting point position (S4).

Then, the control unit 14 determines the list box whose choice is to be changed among the plurality of list boxes based on the direction of indication from the starting point position recognized by the recognition unit 13 and further determines the direction of change of the choice (S5). Further, the control unit 14 determines the amount of change of a choice in the list box based on the length of the input trajectory used for the recognition of the direction of indication or the moving speed of the input position when the input trajectory is input (S6). After that, the control unit 14 displays the selected choice in the list box.

Figure 10:
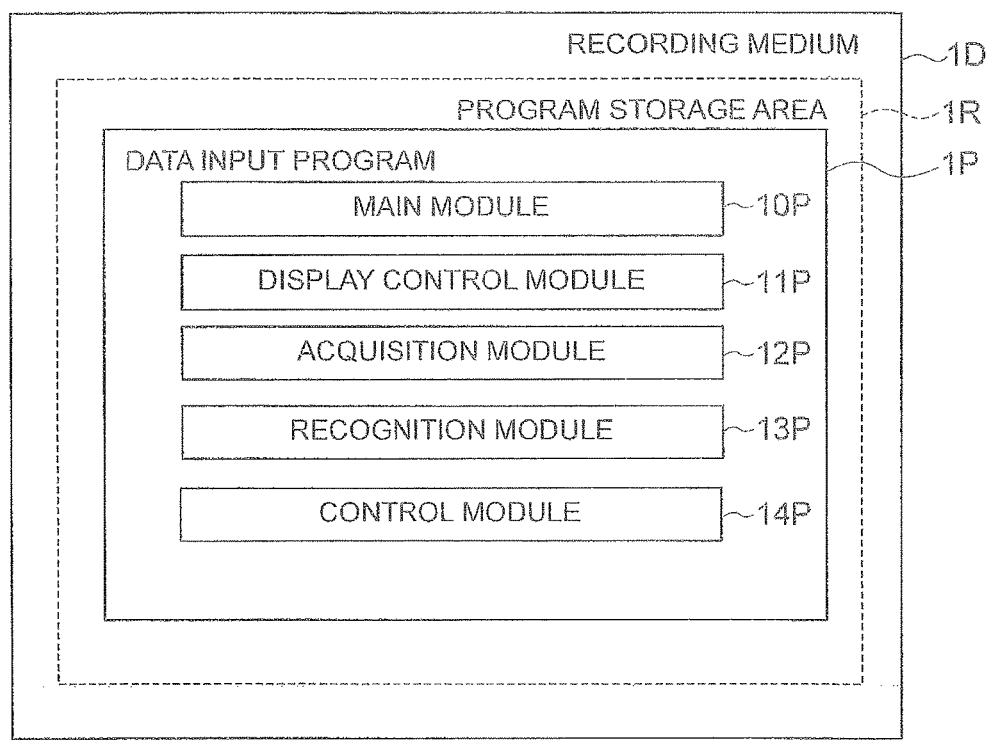
FIG. 10 is a view showing a configuration of a data input program.

A data input program that causes a computer to function as the data input device 1 is described hereinafter with reference to FIG. 10. A data input program 1P includes a main module 10P, a display control module 11P, an acquisition module 12P, a recognition module 13P and a control module 14P.

The main module 10P is a part that exercises control over the data input processing. The functions implemented by executing the display control module 11P, the acquisition module 12P, the recognition module 13P and the control module 14P are respectively equal to the functions of the display control unit 11, the acquisition unit 12, the recognition unit 13 and the control unit 14 of the data input device 1 shown in FIG. 1.

The data input program 1P is provided through a recording medium 1D such as CD-ROM or DVD-ROM or semiconductor memory, for example. Further, the data input program 1P may be provided as a computer data signal superimposed onto a carrier wave over a communication network.

Note that, although the functions are implemented in one terminal device as the data input device 1 as shown in FIG. 1 in the embodiment of the data input system described above, the functions may be distributed over a terminal device and a server. In this case, the data input system according to the present invention may be composed of a terminal device that includes the touch panel 20 including the display means 21 and the input means 22 and a server that includes the display control unit 11, the acquisition unit 12, the recognition unit 13 and the control unit 14, for example. In such a case, the acquisition unit 12 may acquire a set of position information to form the input trajectory with a user input.

According to the data input device 1, the data input method, the data input program 1P and the data input system of the embodiment described above, because both a list box whose choice is to be changed among a plurality of list boxes and the direction of a change of a choice in the list box are determined based on the position of a point that is input in a region including the plurality of list boxes on the display screen and the direction of indication indicating a motion from the point as a starting point, it is possible to change the choice displayed in any list box by operating any position in the region where the plurality of list boxes are displayed as the starting position. This reduces the trouble of setting an operation position at a specified position associated with one list box in order to change the choice displayed in the one list box among a plurality of list boxes.

An embodiment of the present invention is described in detail above. However, the present invention is not limited to the above-described embodiment. Various changes and modifications may be made to the present invention without departing from the scope of the invention.

REFERENCE SIGNS LIST

1 . . . data input device, 11 . . . display control unit, 12 . . . acquisition unit, 13 . . . recognition unit, 14 . . . control unit, 20 . . . touch panel, 21 . . . display means, 22 . . . input means, 1D . . . recording medium, 1P . . . data input program, 10P . . . main module, 11P . . . display control module, 12P . . . acquisition module, 13P . . . recognition module, 14P . . . control module.

The invention claimed is:

1. A data input system comprising:
at least one memory operable to store program code; and
at least one processor operable to read said program code and operate according to said program code, said program code including:
    display control code configured to cause at least one of said at least one processor to display a plurality of list boxes configured for selecting one choice among a plurality of choices on a display screen, the plurality of list boxes placed side by side along a direction substantially orthogonal to a direction of receiving an input to change a choice selectable in each of the list boxes; and
    processing control code configured to cause at least one of said at least one processor to determine both:
        a list box whose choice is to be changed among the plurality of list boxes based on a position of a point input in a region including the plurality of list boxes on the display screen and a motion direction indicating a motion from the point as a starting point, and
        a direction of a change of a choice in the list box based on the motion direction, wherein
    the plurality of list boxes are placed side by side along a first direction on the display screen, and
    the processing control code is further configured to cause at least one of said at least one processor to determine correspondence between a list box whose choice is to be changed and an angle range of the motion direction based on the number of list boxes placed in each of the first direction and a second direction opposite to the first direction viewed from a list box displayed containing the starting point.

2. The data input system according to claim 1, wherein the processing control code is further configured to cause at least one of said at least one processor to divide angle ranges of substantially 180 degrees respectively including a third direction being one of directions of receiving an input to change a choice and substantially orthogonal to the first direction and a fourth direction being another one of directions of receiving an input to change a choice and opposite to the third direction at their center into the same number of parts as the number of list boxes, associates each of the divided angle ranges and each of the list boxes respectively according to an order of sequence, and determines a list box associated with the angle range including the motion direction as a list box whose choice is to be changed.

3. The data input system according to claim 2, wherein
when the motion direction is along the third direction, the processing control code is further configured to cause at least one of said at least one processor to change a choice in the list box displayed containing the starting point according to one order in a sequence of a plurality of choices, and
when the motion direction is along the fourth direction, the processing control code is further configured to cause at least one of said at least one processor to change a choice in the list box displayed containing the starting point according to another order in a sequence of a plurality of choices.

4. The data input system according to claim 3, wherein
when the motion direction is along a direction inclined toward the first direction from the third direction, the processing control code is further configured to cause at least one of said at least one processor to change a choice in any list box placed in the first direction viewed from the list box displayed containing the starting point according to one order in a sequence of a plurality of choices,
when the motion direction is along a direction inclined toward the first direction from the fourth direction, the processing control code is further configured to cause at least one of said at least one processor to change a choice in any list box placed in the first direction viewed from the list box displayed containing the starting point according to another order in a sequence of a plurality of choices,
when the motion direction is along a direction inclined toward the second direction from the third direction, the processing control code is further configured to cause at least one of said at least one processor to change a choice in any list box placed in the second direction viewed from the list box displayed containing the starting point according to one order in a sequence of a plurality of choices, and
when the motion direction is along a direction inclined toward the second direction from the fourth direction, the processing control code is further configured to cause at least one of said at least one processor to change a choice in any list box placed in the second direction viewed from the list box displayed containing the starting point according to another order in a sequence of a plurality of choices.

5. The data input system according to claim 1, wherein the processing control code is further configured to cause at least one of said at least one processor to determine a list box whose choice is to be changed among the plurality of list boxes based on a duration of a press following the input of the starting point.

6. The data input system according to claim 5, wherein the processing control code is further configured to cause at least one of said at least one processor to determine a list box placed at a longer distance from the list box displayed containing the starting point as a list box whose choice is to be changed as the duration is longer.

7. The data input system according to claim 5, wherein the processing control code is further configured to cause at least one of said at least one processor to change a list box whose choice is to be changed in a circular manner according to an order of sequence with an increase in the duration.

8. The data input system according to claim 1, wherein the processing control code is further configured to cause at least one of said at least one processor to recognize the motion direction based on the starting point and one or more points input after the input of the starting point, and determine an amount of change of a choice in the list box based on a length from the starting point to a last point input among points used for recognizing the motion direction or based on a period of time from when the starting point is input to when a last point input among points used for recognizing the motion direction is input.

9. A data input method performed by at least one processor in a data input system, comprising:
    displaying a plurality of list boxes configured for selecting one choice among a plurality of choices on a display screen, the plurality of list boxes placed side by side along a direction substantially orthogonal to a direction of receiving an input to change a choice selectable in each of the list boxes; and
    determining both, a list box whose choice is to be changed among the list boxes based on a position of a point input in a region including the plurality of list boxes on the display screen and a motion direction indicating a motion from the point as a starting point, and a direction of a change of a choice in the list box based on the motion direction, wherein
    the plurality of list boxes are placed side by side along a first direction on the display screen, and
    the determining includes determining correspondence between a list box whose choice is to be changed and an angle range of the motion direction based on the number of list boxes placed in each of the first direction and a second direction opposite to the first direction viewed from a list box displayed containing the starting point.

10. A non-transitory computer-readable recording medium storing a data input program for causing a computer to:
    display a plurality of list boxes configured to allow selection of one choice among a plurality of choices on a display screen, the plurality of list boxes placed side by side along a direction substantially orthogonal to a direction of receiving an input to change a choice selectable in each of the list boxes; and
    determine both a list box whose choice is to be changed among the plurality of list boxes based on a position of a point input in a region including the plurality of list boxes on the display screen and a motion direction indicating a motion from the point as a starting point, and a direction of a change of a choice in the list box based on the motion direction, wherein
    the plurality of list boxes are placed side by side along a first direction on the display screen, and
    the determination includes determination of a correspondence between a list box whose choice is to be changed and an angle range of the motion direction based on the number of list boxes placed in each of the first direction and a second direction opposite to the first direction viewed from a list box displayed containing the starting point.

* * * * *